June 8, 1948.  E. GINN ET AL  2,442,924
ENGINE
Filed June 28, 1945  2 Sheets-Sheet 1

Earl Ginn
Kenneth M. Cloud
INVENTORS

BY G. F. Hauke
Attorney

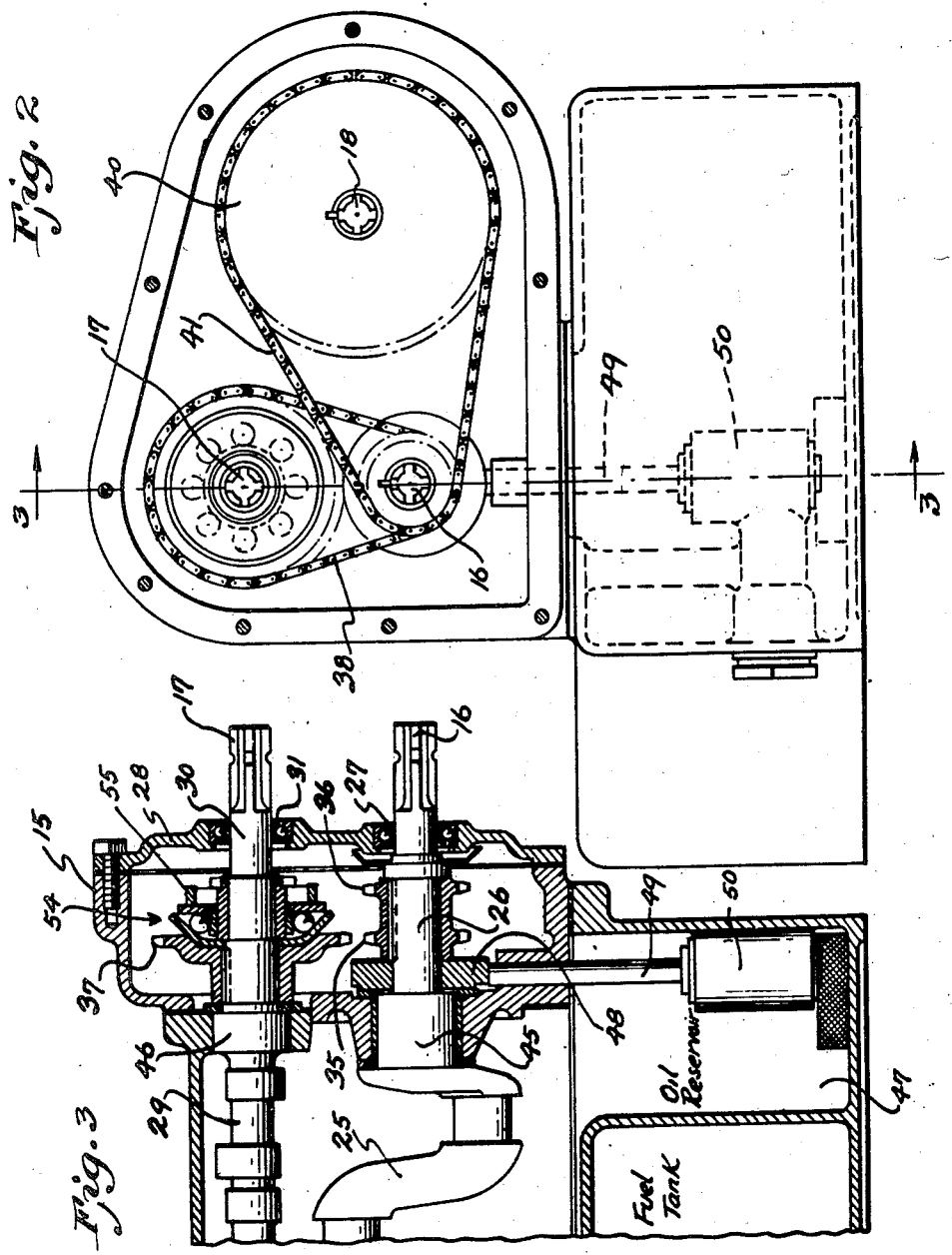

Patented June 8, 1948

2,442,924

UNITED STATES PATENT OFFICE 2,442,924

ENGINE

Earl Ginn and Kenneth M. Cloud, North Muskegon, Mich., assignors to Continental Motors Corporation, Muskegon, Mich., a corporation of Virginia Application June 28, 1945, Serial No. 601,984

2 Claims. (Cl. 123—195)

This invention relates to an engine assembly and has particularly to do with a portable internal combustion utility engine.

The design of this engine contemplates a complete self-contained unit including fuel tank and oil reservoir weighing about 50 pounds. The engine is intended to be used at various spots in a factory, on a farm or in repair shops where a single power unit may be removably coupled to tools and appliances as desired. For example on a farm, the engine could be used to operate a feed grinder, a cream separator, a water pump, a concrete mixer, power saw and so on.

In addition to light and simple design, the versatility of the unit is increased by a plurality of power take-off points varying in speed and gear relation to the direct crankshaft drive.

Another feature of the invention resides in the compact design wherein the various speed shafts are used for cam shafts, pumping shafts, governor controls and the like.

Still another feature resides in the design in which the various parts of the engine are located in relation to each other to permit the cooperation of the various elements as described.

For a more detailed understanding of our invention, reference may be had to the accompanying drawings which illustrate one form which our invention may assume, and in which:

Fig. 2 is an end elevation of the engine with the transmission cover removed, and Fig. 3 is a partial section taken on line 3—3 of Fig. 2.

Figure 1:
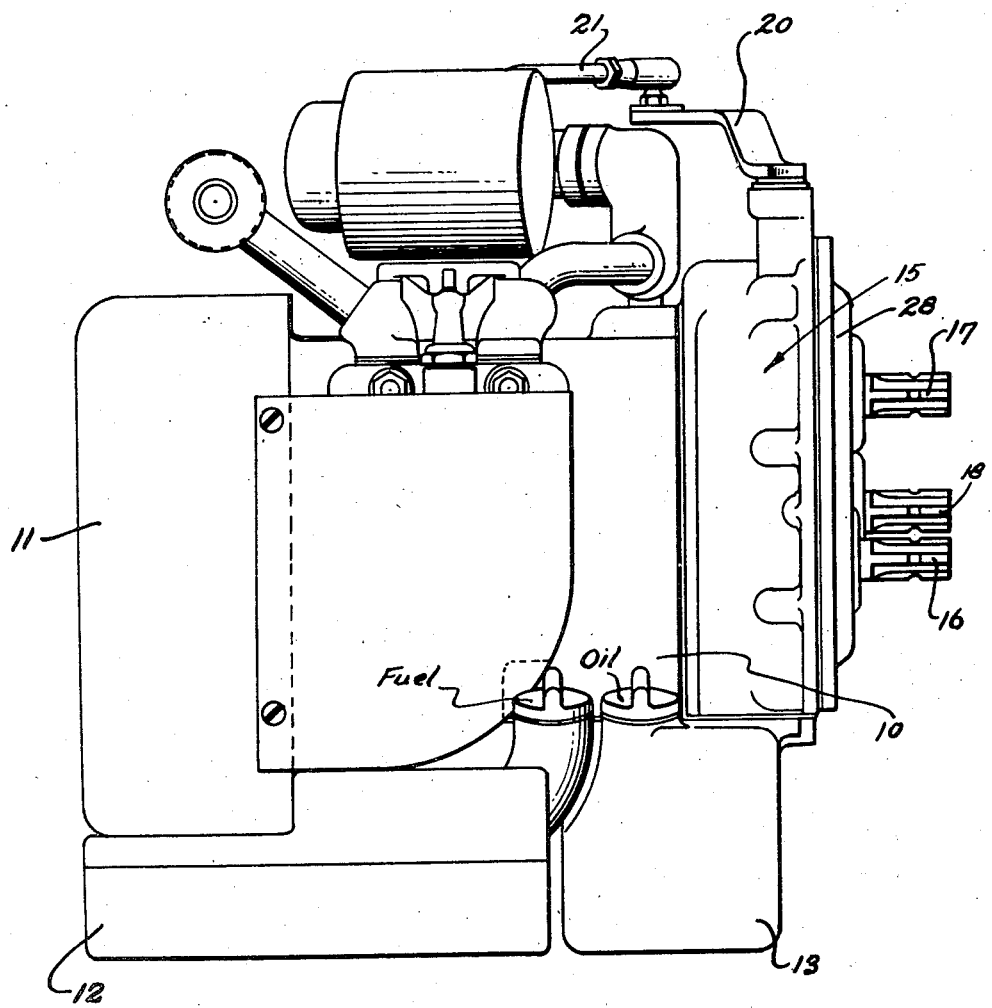
Fig. 1 is a side elevation of a complete engine unit.

In the drawings, with particular reference to Fig. 1, an internal combustion engine is shown with a crankcase 10 and flywheel and fan housing 11 positioned over a fuel tank 12 and a lubricant oil reservoir 13.

The transmission case is shown at 15 with power take-off shafts 16, 17 and 18 having varying speeds as will be described. A governor lever 20 is operatively connected to a throttle control 21.

In Fig. 3, a crankshaft 25 is extended at 26 and journaled at 27 in a cover plate 28. Above and parallel with the axis of the crankshaft is a cam shaft 29 suitably journaled in the engine housing and extended at 30 through a bearing 31 in cover plate 28. The shaft 18 is journaled at points (not shown) in engine housing and plate 28.

The various shafts are connected by chain drives. A double sprocket having toothed portions 35 and 36 is splined to shaft 26. On shaft 30 is splined single sprocket 37. A chain 38 connects sprockets 35 and 37. On shaft 18 is a large sprocket 40 connected by chain 41 to sprocket 36. In speed relations the wheel 37 and shaft 17 would be one-half of the direct drive shaft 16. The shaft 18 may rotate at ⅓ or ¼ of the direct drive depending on the size of sprocket-wheel 40.

The relationship of the various portions of the engine should be noted. The main bearings 45 and 46 of the crankshaft and cam shaft respectively are spaced inwardly of the engine in order that the transmission 15 may overlie reservoir 47 which holds the excess lubricating oil. Beside sprocket 35 is a cam wheel 48 rotated by shaft 26. This cam wheel cooperates with plunger 49 of oil pump 50 to provide oil to the lubricating system.

Adjacent sprocket-wheel 37 on shaft 30 is a speed governor control 54 of standard construction, centrifugal ball type which operates forked member 55 connected to lever 20 found in Fig. 1. The position of the transmission housing 15 likewise results in the governor controls falling within the general confines of the engine. In addition it should be noted that the cam shaft 29 is driven by sprocket 37 even as is power take-off pinion 17. Thus no separate cam shaft gearing is necessary.

The entire design lends itself, therefore, to a compact and simplified engine with great portability and versatility.

Although we have illustrated but one form of our invention and have described in detail but a single application thereof, it will be apparent to those skilled in the art to which our invention pertains, that various modifications and changes may be made therein without departing from the spirit of our invention or from the scope of the appended claims.

We claim:

1. In an internal combustion engine of the portable type having a crankcase and a crankshaft supported thereby at one end, said crankcase constructed and arranged to provide an oil reservoir at one end only thereof, a transmission housing structure secured to one end of the crankcase and overlying said oil reservoir, said housing structure being provided with a crankshaft bearing serving as the sole support of the other end of said crankshaft, said crankshaft having an extension projecting into said transmission housing and drivingly connected with a plurality of driven elements in said transmission housing, an oil pump in said oil reservoir, a driving element mounted on the crankshaft in said transmission housing, and means drivingly connecting said driving element with said oil pump and extending through a wall of said transmission housing overlying said oil reservoir.

2. In an internal combustion engine of the portable type having a crankcase and a crankshaft supported thereby at one end, said crankcase constructed and arranged to provide an oil reservoir at one end only thereof, a transmission housing structure secured to one end of the crankcase and overlying said oil reservoir, said housing structure being provided with a crankshaft bearing serving as the sole support of the other end of said crankshaft, said crankshaft having an extension projecting into said transmission housing and drivingly connected with a plurality of driven elements in said transmission housing, an oil pump in said oil reservoir, a cam mounted on said crankshaft in said transmission housing, a plunger actuated by said cam and extending through the wall of said transmission housing overlying said oil reservoir and operatively connected with said oil pump.

EARL GINN.
KENNETH M. CLOUD.

REFERENCES CITED

The following references are of record in the file of this patent:

UNITED STATES PATENTS

| Number | Name | Date |
| --- | --- | --- |
| 921,705 | Hubbell | May 18, 1909 |
| 1,393,132 | Hutchinson | Oct. 11, 1921 |
| 1,393,778 | Heath | Oct. 18, 1921 |
| 1,408,179 | Du Pont | Feb. 28, 1922 |
| 1,552,572 | Scannell | Sept. 8, 1925 |
| 1,734,181 | Pendock | Nov. 5, 1929 |
| 1,758,687 | Chorlton | May 13, 1930 |
| 2,028,310 | Bechman | Jan. 21, 1936 |
| 2,180,352 | Fahrney | Nov. 21, 1939 |
| 2,303,093 | Schreck | Nov. 24, 1942 |